US010140337B2

(12) United States Patent
Champlin et al.

(10) Patent No.: US 10,140,337 B2
(45) Date of Patent: Nov. 27, 2018

(54) FUZZY JOIN KEY

(71) Applicant: SAP SE, Walldorf (DE)

(72) Inventors: Ryan Champlin, La Crosse, WI (US);
Prasanthi Thatavarthy, Onalaska, WI (US); Jeffrey Woody, Onalaska, WI (US); Ronald Dupey, West Salem, WI (US)

(73) Assignee: SAP SE, Walldorf (DE)

( * ) Notice: Subject to any disclaimer, the term of this patent is extended or adjusted under 35 U.S.C. 154(b) by 490 days.

(21) Appl. No.: 14/927,509

(22) Filed: Oct. 30, 2015

(65) Prior Publication Data
US 2017/0124153 A1 May 4, 2017

(51) Int. Cl.
G06F 17/30 (2006.01)
(52) U.S. Cl.
CPC .. G06F 17/30498 (2013.01); G06F 17/30371 (2013.01)
(58) Field of Classification Search
None
See application file for complete search history.

(56) References Cited

U.S. PATENT DOCUMENTS

| 6,721,754 | B1* | 4/2004 | Hurst | G06F 19/705 702/19 |
| 7,756,873 | B2* | 7/2010 | Gould | G06F 17/30466 707/737 |
| 7,966,312 | B2* | 6/2011 | Nolan | G06F 17/30498 707/713 |
| 9,317,544 | B2* | 4/2016 | Ganjam | G06F 17/30303 |
| 9,720,971 | B2* | 8/2017 | Bittner | G06F 17/30507 |
| 2009/0327208 | A1* | 12/2009 | Bittner | G06F 17/30507 706/61 |
| 2012/0254245 | A1* | 10/2012 | Foti | G06F 17/30498 707/780 |
| 2013/0151502 | A1* | 6/2013 | Yoon | G06F 17/30498 707/714 |
| 2017/0109402 | A1* | 4/2017 | Brewster | G06F 17/30454 |

* cited by examiner

Primary Examiner — Bai D Vu
(74) Attorney, Agent, or Firm — Buckley, Maschoff & Talwalkar LLC

(57) ABSTRACT

A system includes identification of a first one or more columns of a first database table as associated with a first entity and a first one or more columns of a second database table as associated with the first entity, mapping of the data of each row of the first one or more columns of the first database table to respective first rows of a predetermined schema associated with the entity, mapping of the data of each row of the first one or more columns of the second database table to respective second rows of the predetermined schema associated with the entity, determining of matching ones of the first rows and the second rows, and based on the matching ones of the first rows and the second rows, identification of the first one or more columns of the first database table and the first one or more columns of the second database table as a JOIN key between the first database table and the second database table.

19 Claims, 13 Drawing Sheets

| DUNS | Name | Status | Subsid |
|---|---|---|---|
| 0324100 | COCA-COLA | ... | ... |
| 0157070 | IBM | ... | ... |
| 0138500 | MICROSOFT | ... | ... |
| 0535985 | GOOGLE | ... | ... |
| 0134200 | MCDONALDS | ... | ... |
| 0393500 | SAP | ... | ... |
| 0824200 | AMERICAN EXPRESS | ... | ... |

*FIG. 1A*

| Customer | DUNS |
|---|---|
| Coca Cola | 0324100 |
| Int'l Business Machines | 0157070 |
| McDonalds | 0138500 |
| AMEX | 0535985 |

*FIG. 1B*

| Customer | DUNS | Status | Subsid |
|---|---|---|---|
| Coca Cola | 0324100 | ... | ... |
| Int'l Business Machines | 0157070 | ... | ... |
| McDonalds | 0138500 | ... | ... |
| AMEX | 0535985 | ... | ... |

*FIG. 1C*

| Customer |
|---|
| Coca Cola |
| Int'l Business Machines |
| McDonalds |
| AMEX |

*FIG. 2A*

| Customer | Status | Subsid |
|---|---|---|
| Coca Cola | | |
| Int'l Business Machines | | |
| McDonalds | ... | ... |
| AMEX | | |

*FIG. 2B*

| | | -810 |
|---|---|---|
| | Name | |
| | LIZ COLEMAN, CPA | |

| | -820 | | |
|---|---|---|---|
| First | Middle | Last | |
| ELIZABETH | A. | COLEMAN-DE CRUZ (MRS.) | |

*FIG. 8*

| Person Entity Schema Columns | 810, Row 1 | 820, Row 1 |
|---|---|---|
| PERSON_GN | LIZ | ELIZABETH |
| PERSON_GN_STD | ELIZABETH | |
| PERSON_GN_STD2 | | |
| PERSON_GN_STD3 | | |
| PERSON_GN_STD4 | | |
| PERSON_GN_STD5 | | |
| PERSON_GN_STD6 | | |
| PERSON_GN2 | | A |
| PERSON_GN2_STD | | |
| PERSON_GN2_STD2 | | |
| PERSON_GN2_STD3 | | |
| PERSON_GN2_STD4 | | |
| PERSON_GN2_STD5 | | |
| PERSON_GN2_STD6 | | |
| PERSON_FN | COLEMAN | COLEMAN CRUZ |
| PERSON_FN_STD | | |
| PERSON_MATPOST | | |
| PERSON_MATPOST_STD | | |

FUZZY JOIN KEY

BACKGROUND

Enterprise database systems store vast amounts of data received from one or more different sources. This data is typically stored in records of relational database tables. As such, the data may be retrieved, modified, supplemented and otherwise manipulated using a relational query language such as Structured Query Language (SQL).

One common operation is to join two or more tables based on data which is common to the tables to be joined. FIGS. 1A and 1B illustrate tables 10 and 12, respectively, for the purpose of explaining a join operation. More specifically, it may be desired to join tables 10 and 12 based on the column "DUNS" in order to generate a table including data from both tables. Since every DUNS value of table 12 also exists in table 10, all records of table 12 are enriched by the join as shown in table 14 of FIG. 1C.

FIG. 2A illustrates table 20, which is identical to table 12 but does not include the column DUNS. In such a case, the customer data is the join key and the join occurs on the data of column Name of table 10 and the data of column Customer of table 20. Due to differing punctuation, abbreviations and capitalizations, only the "McDonalds" value of the Customer column of table 20 matches an identical value of the Name column of table 10. As a result, the generated table 25 of FIG. 2B only enriches the "McDonalds" customer record. The other records of table 25 include no values in the Status and Subsid columns.

Even if the data were stored in tables according to standardized punctuation, capitalization and abbreviations, differing table schemas may prevent conventional joins. For example, one table may store a person's name in a single column (e.g., Name) while another table may store name data in multiple columns (e.g., First, Middle, Last). In another example, one table may store a person's address in two columns (e.g., Address and CityStateZip) while another table may store address data in seven columns (e.g., HouseNumber, Street, UnitNumber, City, Region, Postcode, Country). Efficient systems are desired to execute joins in the above-described and other scenarios.

BRIEF DESCRIPTION OF THE DRAWINGS

FIG. 1A is a tabular representation of a database table.
FIG. 1B is a tabular representation of a database table.
FIG. 1C is a tabular representation of a joined database table.
FIG. 2A is a tabular representation of a database table.
FIG. 2B is a tabular representation of a joined database table.
FIG. 8 is a tabular representation of a database table according to some embodiments.
FIG. 9 is a tabular representation of a database table according to some embodiments.
FIG. 12 is an outward view of a user interface according to some embodiments.

DETAILED DESCRIPTION

The following description is provided to enable any person in the art to make and use the described embodiments. Various modifications, however, will remain readily apparent to those in the art.

Figure 3:
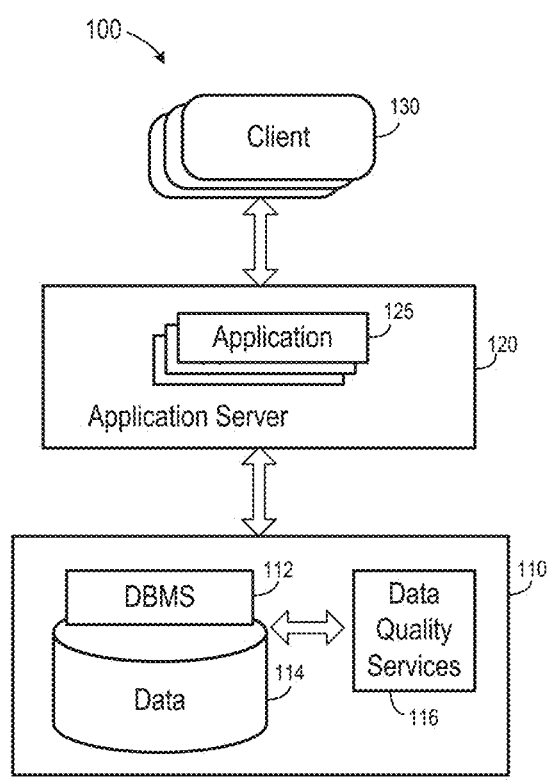
FIG. 3 is a block diagram of a database architecture according to some embodiments.

FIG. 3 is a block diagram of database architecture 100 according to some embodiments. Embodiments are not limited to architecture 100 or to a database architecture. Architecture 100 includes database 110, application server 120 and clients 130.

Application server 120 executes and provides services to applications 125. Applications 125 may comprise server-side executable program code (e.g., compiled code, scripts, etc.) which provide functionality to clients 130 by providing user interfaces to clients 130, receiving requests from clients 130, retrieving data from database 110 based on the requests, processing the data received from database 110, and providing the processed data to clients 130. Applications 125 executing within application server 120 may also expose administrative functions to clients 130, including but not limited to data quality services as will be described below. Applications 125 may be made available for execution by application server 120 via registration and/or other procedures which are known in the art.

Application server 120 provides any suitable interfaces through which clients 130 may communicate with applications 125 executing on application server 120. For example, application server 120 may include a HyperText Transfer Protocol (HTTP) interface supporting a transient request/response protocol over Transmission Control Protocol (TCP), a WebSocket interface supporting non-transient full-duplex communications between application server 120 and any clients 130 which implement the WebSocket protocol over a single TCP connection, and/or an Open Data Protocol (OData) interface.

Database 110 comprises database management system (DBMS) 112, data 114 and data quality services 116. One or more applications 125 executing on server 120 may communicate with DBMS 112 using database management interfaces such as, but not limited to, Open Database Connectivity (ODBC) and Java Database Connectivity (JDBC) interfaces. These types of applications 125 may use Structured Query Language (SQL) to manage and query data stored in database 110.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. Data 114 may be distributed among several relational databases, dimensional databases, and/or other data sources. Embodiments are not limited to any number or types of data sources.

DBMS 112 serves requests to retrieve and/or modify data 114, and also performs administrative and management functions. Such functions may include snapshot and backup management, indexing, optimization, garbage collection, and/or any other database functions that are or become known. Database 110 may also provide application logic, such as database procedures and/or calculations, according to some embodiments. This application logic may comprise scripts, functional libraries and/or compiled program code.

In some embodiments, data 114 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Data 114 may store metadata regarding the structure, relationships and meaning of the data stored within data 114. This information may include data defining the schema of database tables stored within data 114. A database table schema may specify the name of the database table, columns of the database table, the data type associated with each column, and other information associated with the database table.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data quality services 116 may comprise functions to selectively process data of data 114. These functions may include, but are not limited to, data cleansing, data matching, best record identification, semantic profiling and data enrichment functions. These functions may be exposed to applications 125 via the OData protocol, and thereby available to clients 130 for direct initiation or as underlying processes of an algorithm executed by an application 125.

Application server 120 may be separated from or closely integrated with database 110. A closely-integrated application server 120 may enable execution of server applications 125 completely on database 110, without the need for an additional application server. For example, according to some embodiments, database 110 includes a comprehensive set of embedded services which provide end-to-end support for Web-based applications. The services may include a lightweight web server, configurable support for OData, server-side JavaScript execution and access to SQL and SQLScript.

Each of clients 130 may comprise one or more devices executing program code of a software application for presenting user interfaces to allow interaction with application server 120. The user interfaces may comprise user interfaces suited for reporting, data analysis, and/or any other functions based on data 114.

Presentation of a user interface as described herein may comprise any degree or type of rendering, depending on the type of user interface code generated by application server 120. For example, a client 130 may execute a Web Browser to request and receive a Web page (e.g., in HTML format) from application server 120 via HTTP, HTTPS, and/or WebSocket, and may render and present the Web page according to known protocols. One or more of clients 130 may also or alternatively present user interfaces by executing a standalone executable file (e.g., an .exe file) or code (e.g., a JAVA applet) within a virtual machine.

Figure 4A:
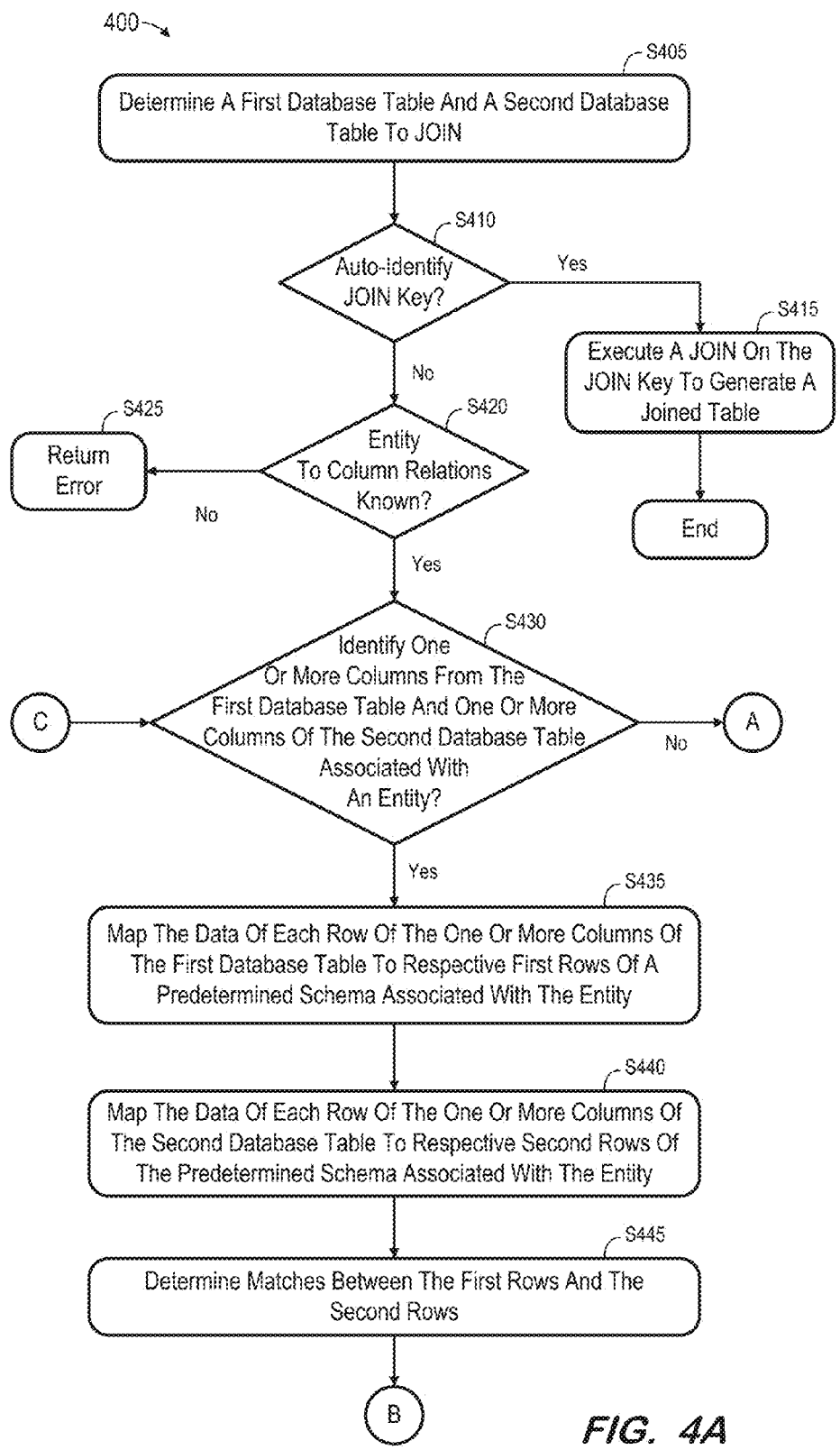
FIGS. 4A and 4B comprise a flow diagram of a process according to some embodiments.
Figure 4B:
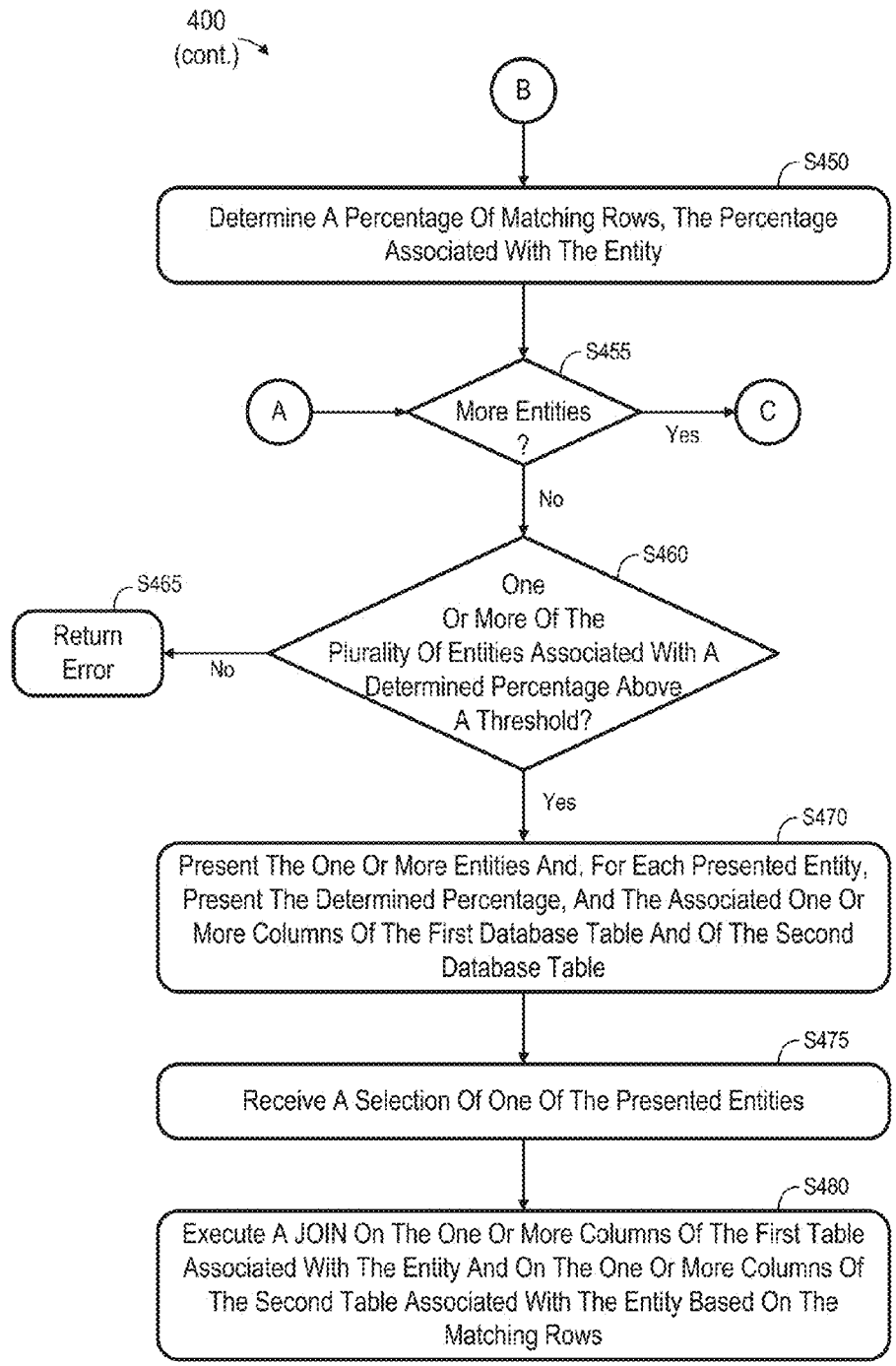

FIGS. 4A and 4B comprises a flow diagram of process 400 according to some embodiments. Process 400 may facilitate the execution of database table joins according to some embodiments. In some embodiments, various hardware elements of architecture 100 (e.g., one or more processors) execute program code to perform process 400. The program code may be implemented within data quality services 116 according to some embodiments.

Process 400 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S405, a first database table and a second database table to join are determined. Any system for selecting a first database table and a second database table may be used in some embodiments of S405. The determination at S405 may be responsive to a command received from a user. For example, a client device 130 may access a data analysis application 125 of application server 120 and may present user interfaces thereof. A user may manipulate the user interfaces in order to select two database tables to join.

Figure 5:
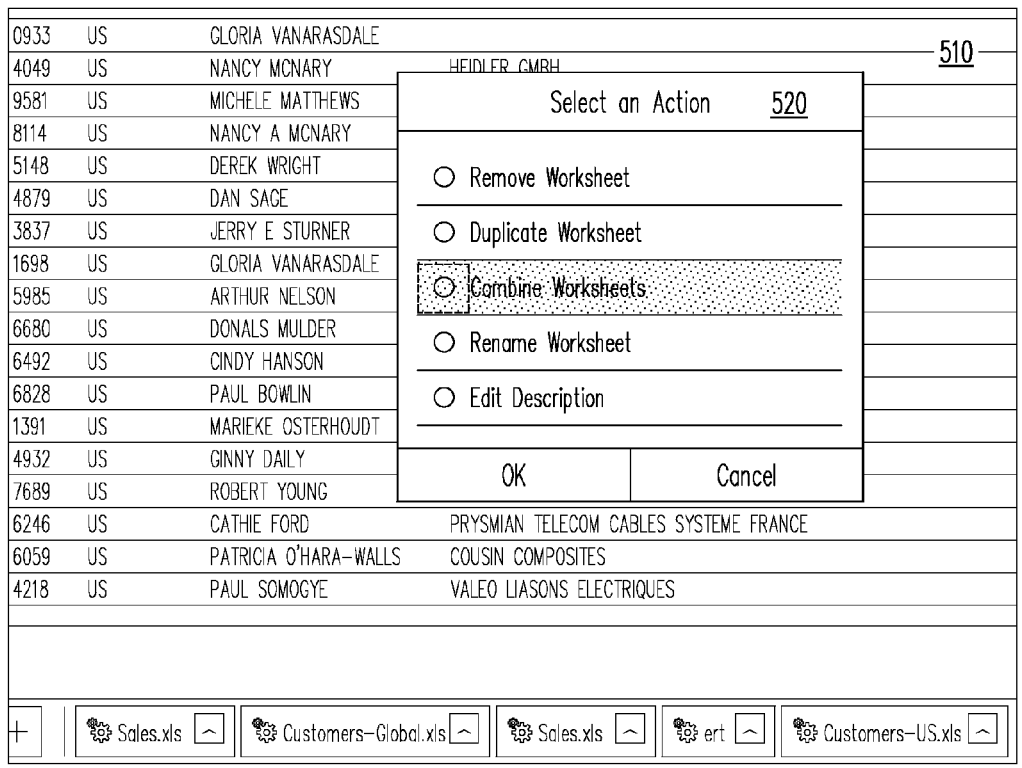
FIG. 5 is an outward view of a user interface according to some embodiments.

FIG. 5 is an outward view of user interface (UI) 500 as displayed by a display device during S405 according to some embodiments. UI 500 may be presented on any type of display apparatus (e.g., desktop monitor, smartphone display, tablet display) provided by any type of client device 130 (e.g., desktop system, smartphone, tablet computer). UI 500 includes displayed worksheet 510 and dialog box 520 superimposed thereon. Dialog box 520 may be displayed in response to a prior command to initiate some action with respect to worksheet 510. As shown, the user has selected the action Combine Worksheets. This selection is transmitted to the application 125 upon selection of OK button 525.

Figure 6:
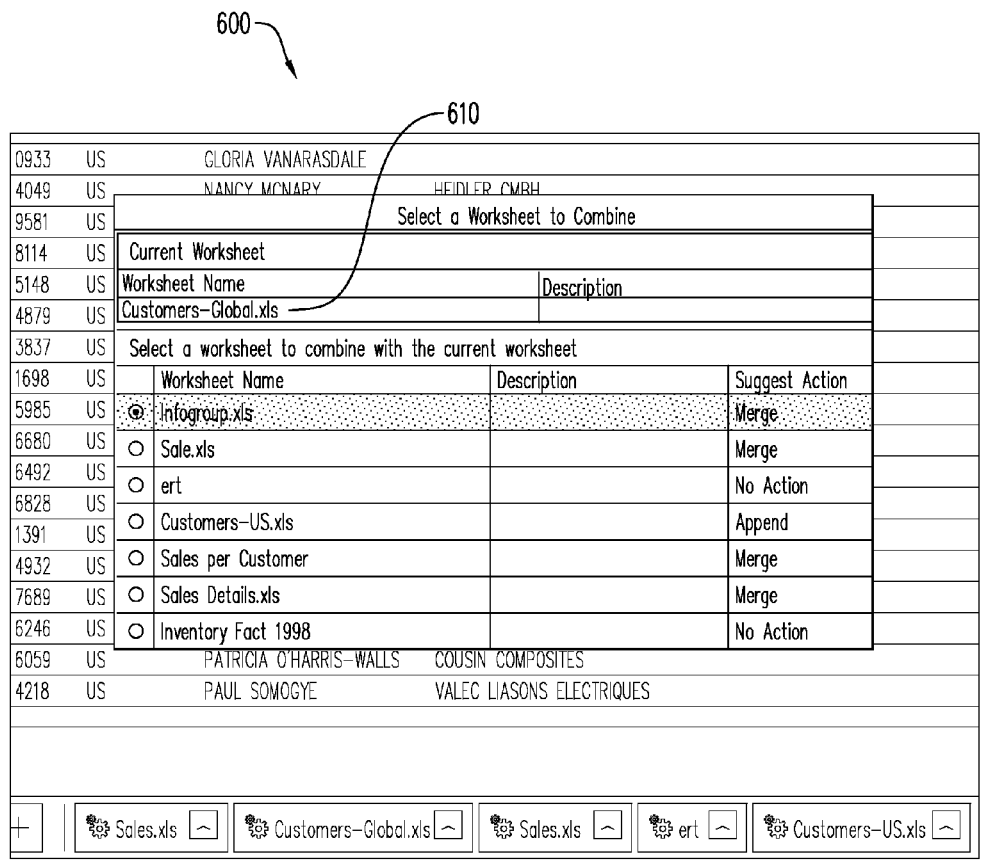
FIG. 6 is an outward view of a user interface according to some embodiments.

FIG. 6 illustrates UI 600 displayed in response to selection of OK button 525 according to the present example. UI 600 shows name 610 of worksheet 510 and a list of other worksheets to potentially combine (i.e., JOIN) with worksheet 510. The user has selected "infogroup.xls" from the list. Therefore, the first database table determined at S405 is the database table of data 114 which holds the data of worksheet 510 and the second database table is the database table of data 114 which holds the data of "infogroup.xls". According to some embodiments, the first database table (and/or the second database table) may comprise a subset of records of a complete database table stored in data 114.

Flow proceeds to S410 after determination of the first database table and the second database table. At S410, it is determined whether a JOIN key can be automatically identified. The determination may be based on the schema and stored values of each database table. For example, if both tables include a column having a same name, and if all of the values stored in that column of one of the tables are present in the identically-named column of the other table, that column is automatically identified as the JOIN key. Consequently, flow proceeds to S415 to execute a JOIN on the identified JOIN key as described above and known in the art.

Other criteria for automatically identifying a JOIN key may be used in S410 according to some embodiments. For example, if one column of one of the tables includes at least a threshold percentage (e.g., 90%) of the values of a column of the other table, those columns may be identified as comprising a JOIN key regardless of their names. The threshold percentage may be less in a case that the column names are identical.

Figure 7:
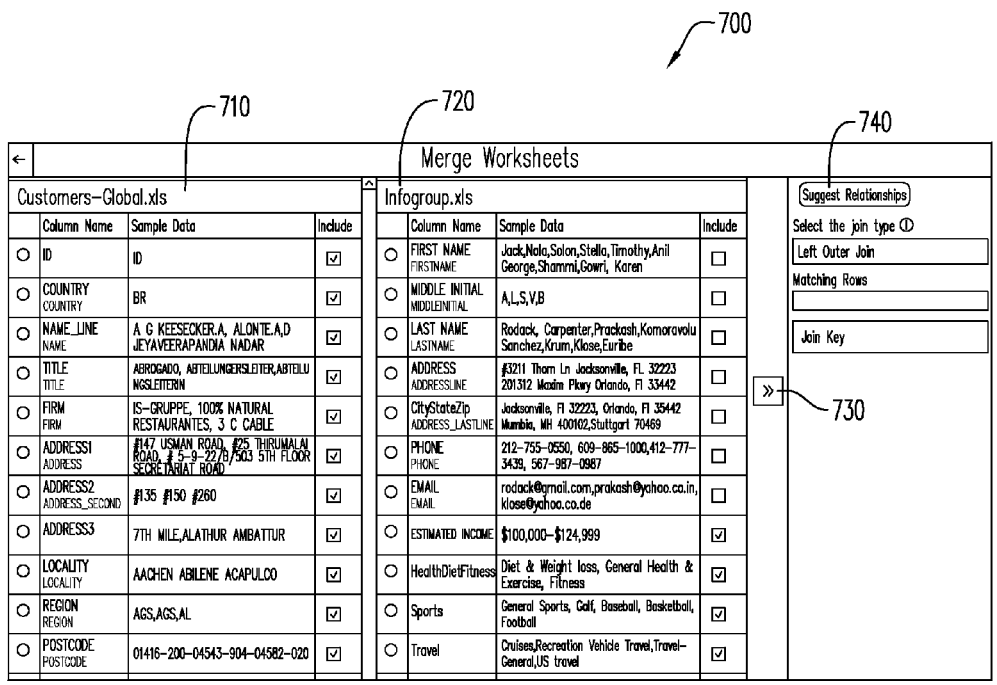
FIG. 7 is an outward view of a user interface according to some embodiments.

FIG. 7 illustrates window 700, which may be displayed according to some embodiments in a case that the determination of S410 is negative. Area 710 of window 700 shows column names and sample data of each column for the first database table (i.e., Customers—Global.xls) and area 720 shows column names and sample data of each column for the second database table (i.e., Infogroup.xls). In some embodiments, a user may define a JOIN key by selecting one or more columns from each of areas 710 and 720 and then selecting UI control 730.

Window 700 also includes button 740 to initiate determination of one or more JOIN keys according to some embodiments. According to these embodiments, flow proceeds from S410 to S420 in response to user selection of button 740.

At S420, it is determined whether any entity to column relations are known. These relations are semantic relations known to database 110 (e.g., stored among data 114) and which relate one or more columns of various data schemas to particular logical entities. For example, the column Name may be mapped to the entity Person and the set of columns First, Middle and Last may also be mapped to the entity Person. In another example, the entity Address may be mapped to the set of two columns Address and CityStateZip and also mapped to the set of seven columns HouseNumber, Street, UnitNumber, City, Region, Postcode, and Country. Flow proceeds to S425 to return an error if it is determined that these relations are not known to the system.

If such relations are known, an attempt is made at S430 to identify one or more columns from the first database table and one or more columns from the second database table which are associated with an entity. For purposes of example, it will be assumed that initially an attempt is made to identify columns which are associated with the Person entity.

FIG. 8 illustrates tabular representations of columns 810 of a first database table and columns 820 of a second database table that may be identified at S430 according to the present example. Columns 810 and 820 only include one record for clarity; any number of records may be present. Referring to an above example, the column Name has been identified from the first database table as being associated with the entity Person, and the columns First, Middle and Last have been identified from the first database table as being associated with the entity Person.

Next, at S435, the data of each row of the one or more identified columns of the first database table are mapped to respective rows of a predetermined schema associated with the entity. Also, at S440, the data of each row of the one or more identified columns of the second database table are mapped to respective rows of the predetermined schema associated with the entity.

FIG. 9 illustrates a tabular representation of the mappings of S435 and S440 according to some embodiments. The predetermined Person entity schema is shown to include eighteen columns. Embodiments are not limited to this number or to the particular columns of FIG. 9.

The mappings of S435 and S440 according to the example will now be described. In S435, the data of the single row of column 810 is mapped to the eighteen columns of FIG. 9. Specifically, the data "Liz" is recognized as a given (i.e., first) name and is mapped to the Person_GN (e.g., Given Name) column. Similarly, the data "Coleman" is recognized as a family name and is mapped to the Person_FN (e.g., Family Name) column. The honorific "CPA" is not been mapped in this example.

According to some embodiments, the mappings of S435 and S440 include cleansing operations. These operations are intended to standardize and prepare the data for optimal matching results. Cleansing operations may include modifying the data for consistent use of punctuations and abbreviations, and for removal of "noise words". Operations may also include generation and storage of alternate name versions.

For example, data 114 may include data cleansing rules associated with the current entity. Data quality services 116 may access these cleansing rules to determine the predetermined schema associated with the entity and standardized or alternative versions of particular data values. For example, data quality services 116 may access stored data cleansing rules of data 114 to determine the standardized version "Elizabeth" of the value "Liz". Accordingly, as shown in FIG. 9, this standardized version is mapped to the Person_GN_STD column of the predetermined schema. The columns Person_GN_STD2 through Person_GN_STD6 may store still other known versions of this first name.

With respect to columns 820, the data "Elizabeth" is recognized as a given name and is mapped to the Person_GN column of the predetermined schema. Since "Elizabeth" is the standardized version of this given name further entry is needed in the corresponding Person_GN_STD column. The data "A." is recognized as a middle name and is mapped to the Person_GN2 column after removing the punctuation "." according to standardization rules. The data "Coleman Cruz" is recognized as a family name and is mapped to the Person_FN column. The data "-De" and "(Mrs.) are considered "noise words" according to the applicable data cleansing rules and are not mapped in this example.

As described above, any type of cleansing operations may be applied during S435 and S440, with the goal of aiding record matching. The operations (dictated by data cleansing rules), as well as the predetermined schemas to which the data are mapped, may differ depending on the type of entity. For example, in the case of an Organization entity, the associated predetermined schema may include two columns. The first column may include the actual organization name (e.g., American Express, Metropolitan Life Insurance) as stored from the one or more columns of the row to be cleansed. The data stored in the schema, according to the Organization entity data cleansing rules, is normalized to exclude punctuation, noise words (e.g., Inc., GmbH, Co., etc.), and common words ("the", "and", etc., in various languages), and to reflect standardized spacing. The second column may store an alternate name of the organization (e.g., AMEX, MetLife, ATT), if one is known (e.g., stored in cleansing data tables of data 114).

The schema used for an Address entity may include many (e.g., nineteen) columns in order to store standardized address components split into various elements found in global address data. The data may be normalized to a standard format as described above, and to include official forms for streets and cities which have multiple valid names. The language and script may be standardized for multilingual/multi-script countries.

Returning to process 400, matches between the first rows and the second rows of the predetermined schema are determined at S445. With respect to the FIG. 9 schema S445 may comprise determining whether any value of any of the seven Person_GN* columns of a row of the first rows match any value of any of the seven Person_GN* columns of a row of the second rows. Further, it may be determined whether any value of any of the seven Person_GN2* columns of the row of the first rows match any value of any of the seven Person_GN2* columns of the row of the second rows, whether any value of any of the two Person_FN* columns of the row of the first rows match any value of any of the two Person_FN* columns of the row of the second rows, and whether any value of any of the two Person_MATPOST* columns of the row of the first rows match any value of any of the two Person_MATPOST* columns of the row of the second rows. The foregoing is repeated for every combination of one of the first rows and one of the second rows.

The matching may be "fuzzy" in that two rows may be considered a match even if their compared values differ slightly. Additionally or alternatively, a match between two rows may be determined even if one or more data the rows do not match with respect to one or more data types. For example, row 1 of column 810 does not include a value in any of the seven Person_GN2* columns which matches the value (i.e., "A") of the seven Person_GN2 columns of row 1 of column 820.

Next, at S450, a percentage of matching rows is determined. The percentage may be determined with respect to the smaller of the first rows and the second rows. For example, if the first rows include fewer rows than the second rows, a percentage of the first rows which match a row of the second rows is determined. This percentage is associated with the current entity (e.g., Person). In other words, the percentage indicates the percentage of rows of the first database table for which the Person entity of a row matches the Person entity of one of the rows of the second database table.

It is determined at S455 whether there are additional entities represented within the first database table and the second database table, based on the columns thereof and the known relations described above. If so, flow returns to S430 and continues as described above to determine the percentage of rows with respect to a next entity. Flow proceeds from S455 to S460 if no additional entities are determined.

At S460, it is determined whether one or more of the identified entities is associated with a matching percentage above a predetermined threshold (e.g., 50%). If not, an error is returned at S465 indicating that no JOIN key can be suggested. S430 through S465 may be executed via program code and/or hardware implementing data quality services 116 according to some embodiments.

Figure 10:
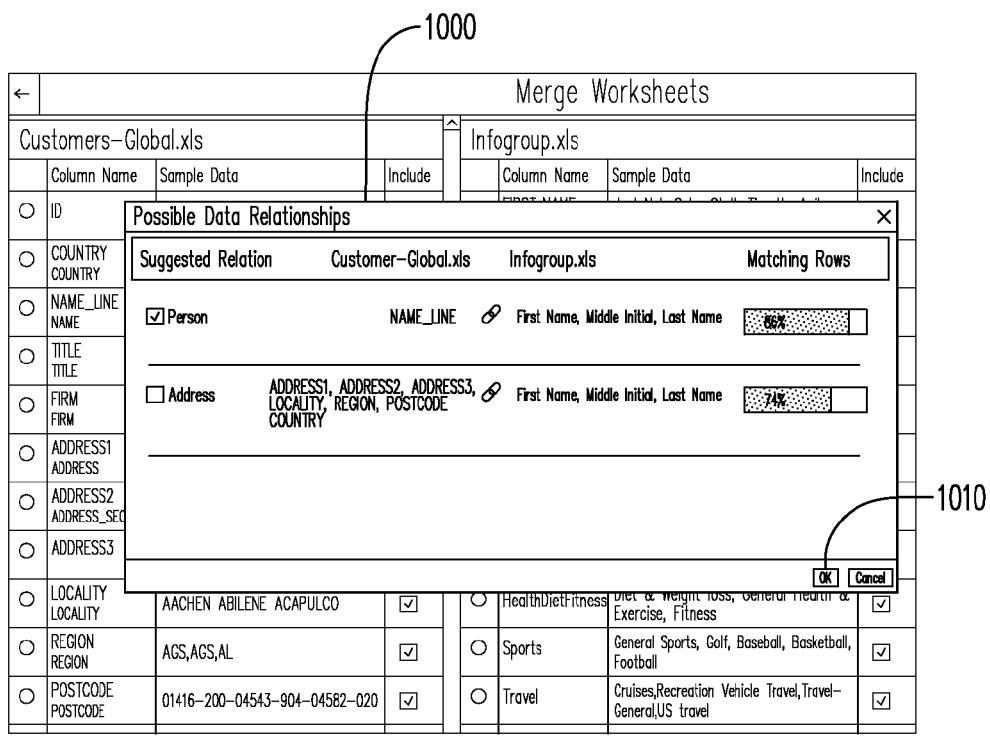
FIG. 10 is an outward view of a user interface according to some embodiments.

If the determination at S460 is affirmative, the one or more entities are presented at S470. For each presented entity, also presented are the determined percentage and the one or more columns of the first and second database tables which are associated with the entity. In some embodiments, after selection of button 740 of window 700, S430 through S460 are executed to determine entities and associated columns and percentages. These entities, columns and percentages may then be presented as shown in window 1000 of FIG. 10.

Window 1000 presents information associated with two entities (Person and Address) represented in the tables Customer-Global.xls and Infogroup.xls. Window 1000 shows column NAME_LINE of table Customer-Global.xls and columns First Name, Middle Initial, and Last Name of table Infogroup.xls as each associated with the Person entity. Based on these columns, the percentage of rows for which a match was identified for the Person entity is 86%.

Columns ADDRESS1, ADDRESS2, ADDRESS3, LOCALITY, REGION, POSTCODE AND COUNTRY of table Customer-Global.xls and columns Address, CityStateZip and Country of table Infogroup.xls are shown as associated with the Address entity. The percentage of rows for which a match was identified for the Address entity is 74%.

Figure 11:
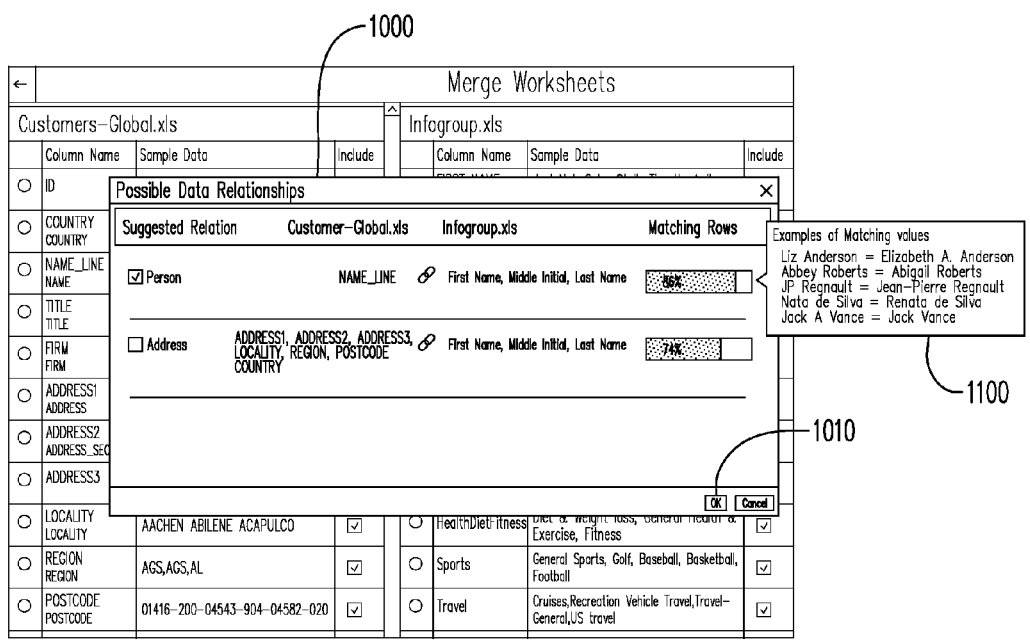
FIG. 11 is an outward view of a user interface according to some embodiments.

FIG. 11 illustrates information window 1100 according to some embodiments. Window 1100 illustrates values, from the columns associated with an entity, which are stored in actual matching rows of the tables. Window 1100 may be presented in response to a user hovering a cursor over the displayed percentage.

Figure 12:
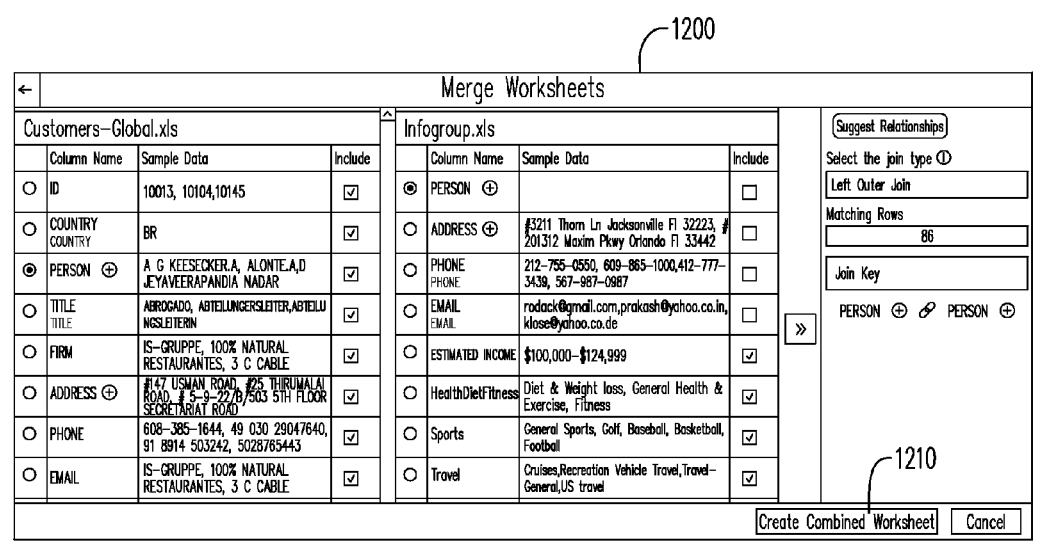

According to the present example, the user selects the Person entity of window 1000 and OK button 1010. The selection is received at S475, resulting in display of window 1200 of FIG. 12. Window 1200 is similar to window 700 of FIG. 7, but also shows all the columns of each identified entity in a single row associated with the entity. The entity rows may be expanded to show the constituent columns according to some embodiments.

Window 1200 also presents the selected JOIN key, in this case, the Person entity. More specifically, the JOINN key is the one or more columns of the first database table associated with the entity (e.g., NAME_LINE) and the one or more columns of the second database table associated with the entity. The user may then select button 1210 to initiate execution of the JOIN at S480.

Figure 13:
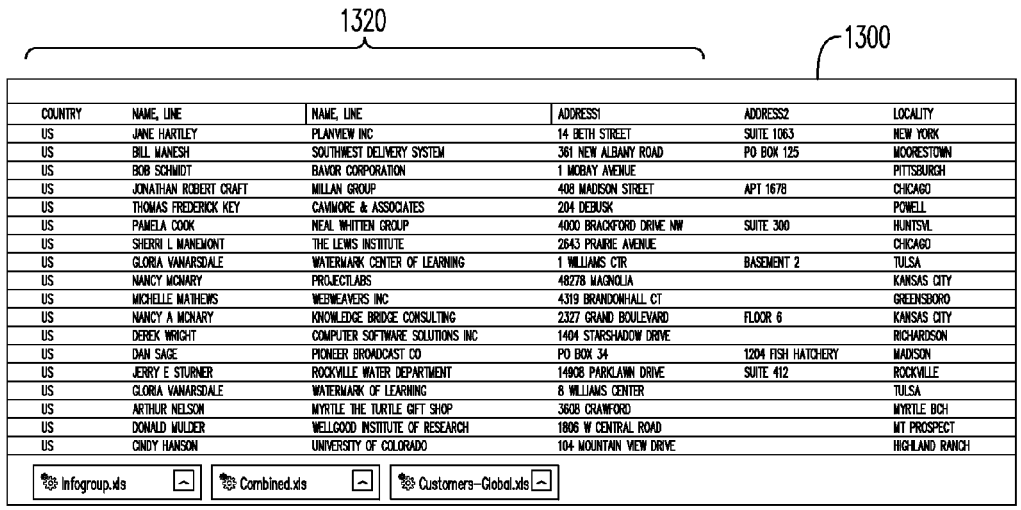
FIG. 13 is an outward view of a user interface according to some embodiments.

The JOIN is executed on the one or more columns of the first database table associated with the entity and on the one or more columns of the second database table associated with the entity, based on the matching rows thereof. The resulting table may then be displayed. FIG. 13 illustrates a portion of resulting table 1300 according to some embodiments, in which selected columns 1310 of table Infogroup.xls have been joined to selected columns 1320 of table Customer-Global.xls by a JOIN key determined as described herein.

Figure 14:
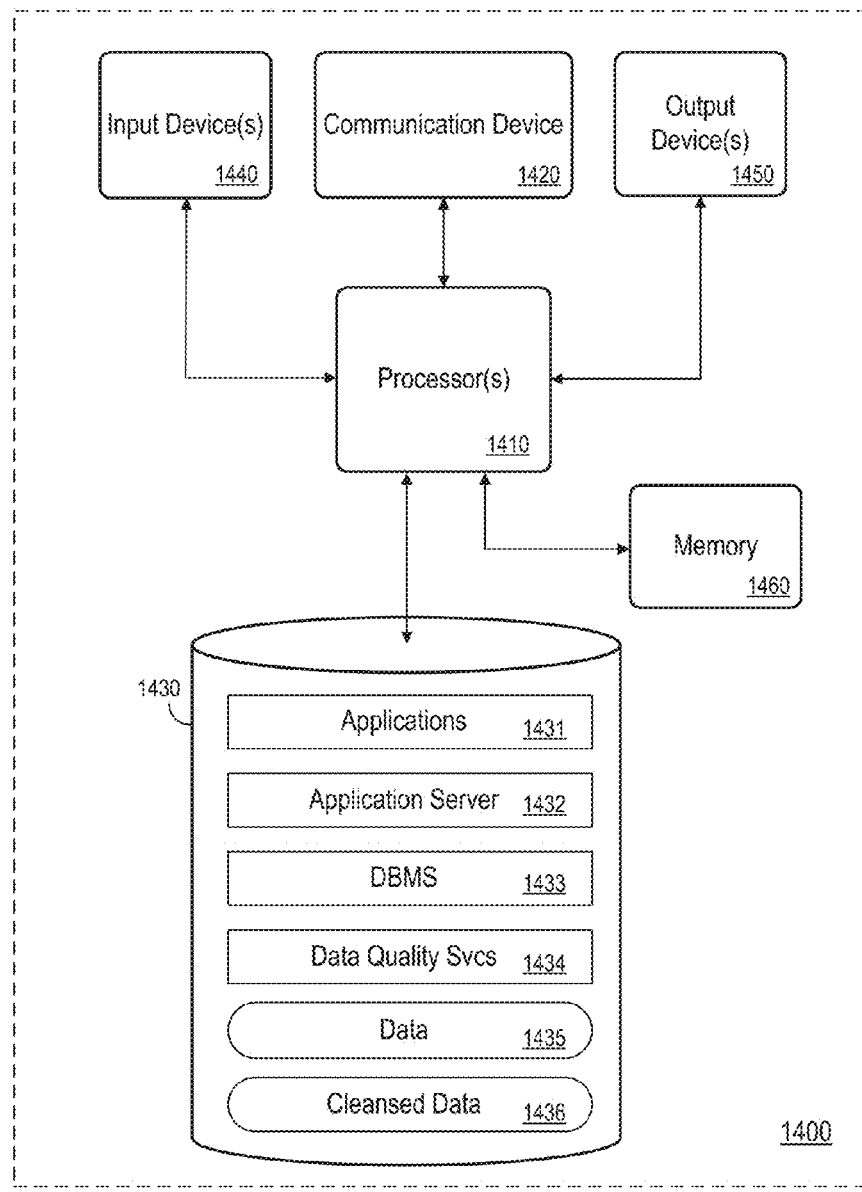
FIG. 14 is a block diagram of an apparatus according to some embodiments.

FIG. 14 is a block diagram of apparatus 1400 according to some embodiments. Apparatus 1400 may comprise a general-purpose computing apparatus and may execute program code to perform any of the functions described herein. According to some embodiments, apparatus 1400 may comprise an implementation of database 110 and application server 130 of FIG. 1. Apparatus 1400 may include other unshown elements.

Apparatus 1400 includes processor 1410 operatively coupled to communication device 1420, data storage device 1430, one or more input devices 1440, one or more output devices 1450 and memory 1460. Communication device 1420 may facilitate communication with external devices, such as a client, or an external data storage device. Input device(s) 1440 may comprise, for example, a keyboard, a keypad, a mouse or other pointing device, a microphone, knob or a switch, an infra-red (IR) port, a docking station, and/or a touch screen. Input device(s) 1440 may be used, for example, to enter information into apparatus 1400. Output device(s) 1450 may comprise, for example, a display (e.g., a display screen) a speaker, and/or a printer.

Data storage device 1430 may comprise any appropriate persistent storage device, including combinations of magnetic storage devices (e.g., magnetic tape, hard disk drives and flash memory), optical storage devices, Read Only Memory (ROM) devices, etc., while memory 1460 may comprise Random Access Memory (RAM), Storage Class Memory (SCM) or any other fast-access memory.

Applications 1431, application server 1432, DBMS 1433 and data quality services 1434 may comprise program code executed by processor 1410 to cause apparatus 1400 to perform any one or more of the processes described herein. Embodiments are not limited to execution of these processes by a single apparatus.

Data 1435 may comprise database tables storing data for one or more applications 1431, warehoused data, and/or any other data desired to be stored. Cleansed data 1436 may comprise data from data 1435 which has been mapped to predetermined schemas associated with entities as described above. The data may be processed during this mapping as described above to standardize the data and/or to prepare the data for further processing, such as but not limited to row matching.

Data 1435 and cleansed data 1436 (either cached or a full database) may be stored in device 1430 as shown and/or in volatile memory such as memory 1460. Data storage device 1430 may also store data and other program code for providing additional functionality and/or which are necessary for operation of apparatus 1400, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
 a first memory storing a first database table and a second database table;
 a second memory storing processor-executable process steps; and
 a processor to execute the processor-executable process steps to cause the system to:
 identify a first one or more columns of the first database table as associated with a first entity and a first one or more columns of the second database table as associated with the first entity;
 map the data of each row of the first one or more columns of the first database table to respective first rows of a predetermined schema associated with the entity;
 map the data of each row of the first one or more columns of the second database table to respective second rows of the predetermined schema associated with the entity;
 determine matching ones of the first rows and the second rows;
 based on the matching ones of the first rows and the second rows, identify the first one or more columns of the first database table and the first one or more columns of the second database table as a JOIN key between the first database table and the second database table; and
 execute a JOIN of the first database table and the second database table by applying the JOIN key.

2. The system according to claim 1, the processor to execute the processor-executable process steps to cause the system to:
 execute the JOIN over the first one or more columns of the first database table and the first one or more columns of the second database table.

3. The system according to claim 1, wherein identification of the first one or more columns of the first database table and the first one or more columns of the second database table as a JOIN key comprises:
 determination of a percentage of the first rows which match at least one of the second rows; and
 determination that the percentage is greater than a threshold percentage.

4. The system according to claim 1, the processor further to execute the processor-executable process steps to cause the system to:
 identify a second one or more columns of the first database table as associated with a second entity and second one or more columns of the second database table as associated with the second entity;
 map the data of each row of the second one or more columns of the first database table to respective first rows of a second predetermined schema associated with the second entity;
 map the data of each row of the second one or more columns of the second database table to respective second rows of the second predetermined schema associated with the second entity;
 determine matching ones of the first rows of the second predetermined schema and the second rows of the second predetermined schema; and
 based on the matching ones of the first rows of the second predetermined schema and the second rows of the second predetermined schema, identify the second one or more columns of the first database table and the second one or more columns of the second database table as a second JOIN key between the first database table and the second database table.

5. The system according to claim 4, wherein mapping of the data of each row of the first one or more columns of the first database table to respective first rows of the predetermined schema associated with the entity comprises modifying the data of each row of the first one or more columns of the first database table based on first data cleansing rules associated with the entity,
 wherein mapping of the data of each row of the first one or more columns of the second database table to respective second rows of the predetermined schema associated with the entity comprises modifying the data of each row of the first one or more columns of the second database table based on the first data cleansing rules associated with the entity, wherein mapping of the data of each row of the second one or more columns of the first database table to respective first rows of the second predetermined schema associated with the second entity comprises modifying the data of each row of the second one or more columns of the first database table based on second data cleansing rules associated with the second entity, and wherein mapping of the data of each row of the second one or more columns of the second database table to respective second rows of the second predetermined schema associated with the second entity comprises modifying the data of each row of the second one or more columns of the second database table based on the second data cleansing rules associated with the second entity.

6. The system according to claim 1, the processor further to execute the processor-executable process steps to cause the system to:

identify a second one or more columns of the first database table as associated with a second entity and second one or more columns of the second database table as associated with the second entity;

map the data of each row of the second one or more columns of the first database table to respective first rows of a second predetermined schema associated with the second entity;

map the data of each row of the second one or more columns of the second database table to respective second rows of the second predetermined schema associated with the second entity;

determine matching ones of the first rows of the second predetermined schema and the second rows of the second predetermined schema;

determine a percentage of the first rows of the second predetermined schema which match at least one of the second rows of the second predetermined schema determine that the percentage is less than a threshold percentage; and based on the determination that the percentage is less than a threshold percentage, identify the second one or more columns of the first database table and the second one or more columns of the second database table as not comprising a JOIN key between the first database table and the second database table.

7. The system according to claim 1, wherein mapping of the data of each row of the first one or more columns of the first database table to respective first rows of the predetermined schema associated with the entity comprises modifying the data of each row of the first one or more columns of the first database table based on first data cleansing rules associated with the entity, and wherein mapping of the data of each row of the first one or more columns of the second database table to respective second rows of the predetermined schema associated with the entity comprises modifying the data of each row of the first one or more columns of the second database table based on the first data cleansing rules associated with the entity.

8. A computer-implemented method comprising:

identifying a first one or more columns of a first database table as associated with a first entity and a first one or more columns of a second database table as associated with the first entity;

mapping the data of each row of the first one or more columns of the first database table to respective first rows of a predetermined schema associated with the entity;

mapping the data of each row of the first one or more columns of the second database table to respective second rows of the predetermined schema associated with the entity;

determining matching ones of the first rows and the second rows;

based on the matching ones of the first rows and the second rows, identifying the first one or more columns of the first database table and the first one or more columns of the second database table as a JOIN key between the first database table and the second database table; and executing a JOIN of the first database table and the second database table over the first one or more columns of the first database table and the first one or more columns of the second database table.

9. The method according to claim 8, wherein identifying the first one or more columns of the first database table and the first one or more columns of the second database table as a JOIN key comprises:

determining a percentage of the first rows which match at least one of the second rows; and determining that the percentage is greater than a threshold percentage.

10. The method according to claim 8, further comprising:

identifying a second one or more columns of the first database table as associated with a second entity and second one or more columns of the second database table as associated with the second entity;

mapping the data of each row of the second one or more columns of the first database table to respective first rows of a second predetermined schema associated with the second entity;

mapping the data of each row of the second one or more columns of the second database table to respective second rows of the second predetermined schema associated with the second entity;

determining matching ones of the first rows of the second predetermined schema and the second rows of the second predetermined schema; and based on the matching ones of the first rows of the second predetermined schema and the second rows of the second predetermined schema, identifying the second one or more columns of the first database table and the second one or more columns of the second database table as a second JOIN key between the first database table and the second database table.

11. The method according to claim 10, wherein mapping the data of each row of the first one or more columns of the first database table to respective first rows of the predetermined schema associated with the entity comprises modifying the data of each row of the first one or more columns of the first database table based on first data cleansing rules associated with the entity, wherein mapping the data of each row of the first one or more columns of the second database table to respective second rows of the predetermined schema associated with the entity comprises modifying the data of each row of the first one or more columns of the second database table based on the first data cleansing rules associated with the entity, wherein mapping the data of each row of the second one or more columns of the first database table to respective first rows of the second predetermined schema associated with the second entity comprises modifying the data of each row of the second one or more columns of the first database table based on second data cleansing rules associated with the second entity, and wherein mapping the data of each row of the second one or more columns of the second database table to respective second rows of the second predetermined schema associated with the second entity comprises modifying the data of each row of the second one or more columns of the second database table based on the second data cleansing rules associated with the second entity.

12. The method according to claim 8, further comprising:
identifying a second one or more columns of the first database table as associated with a second entity and second one or more columns of the second database table as associated with the second entity;
mapping the data of each row of the second one or more columns of the first database table to respective first rows of a second predetermined schema associated with the second entity;
mapping the data of each row of the second one or more columns of the second database table to respective second rows of the second predetermined schema associated with the second entity;
determining matching ones of the first rows of the second predetermined schema and the second rows of the second predetermined schema;
determining a percentage of the first rows of the second predetermined schema which match at least one of the second rows of the second predetermined schema
determining that the percentage is less than a threshold percentage; and
based on the determination that the percentage is less than a threshold percentage, identifying the second one or more columns of the first database table and the second one or more columns of the second database table as not comprising a JOIN key between the first database table and the second database table.

13. The method according to claim 8, wherein mapping the data of each row of the first one or more columns of the first database table to respective first rows of the predetermined schema associated with the entity comprises modifying the data of each row of the first one or more columns of the first database table based on first data cleansing rules associated with the entity, and
wherein mapping the data of each row of the first one or more columns of the second database table to respective second rows of the predetermined schema associated with the entity comprises modifying the data of each row of the first one or more columns of the second database table based on the first data cleansing rules associated with the entity.

14. A non-transitory computer-readable medium storing program code, the program code executable by a processor to cause the processor to:
identify a first one or more columns of a first database table as associated with a first entity and a first one or more columns of a second database table as associated with the first entity;
map the data of each row of the first one or more columns of the first database table to respective first rows of a predetermined schema associated with the entity;
map the data of each row of the first one or more columns of the second database table to respective second rows of the predetermined schema associated with the entity;

determine matching ones of the first rows and the second rows;
based on the matching ones of the first rows and the second rows, identify the first one or more columns of the first database table and the first one or more columns of the second database table as a JOIN key between the first database table and the second database table; and
execute a JOIN of the first database table and the second database table over the first one or more columns of the first database table and the first one or more columns of the second database table.

15. The medium according to claim 14, wherein identification of the first one or more columns of the first database table and the first one or more columns of the second database table as a JOIN key comprises:
determination of a percentage of the first rows which match at least one of the second rows; and
determination that the percentage is greater than a threshold percentage.

16. The medium according to claim 14, the program code further executable by the processor to cause the processor to:
identify a second one or more columns of the first database table as associated with a second entity and second one or more columns of the second database table as associated with the second entity;
map the data of each row of the second one or more columns of the first database table to respective first rows of a second predetermined schema associated with the second entity;
map the data of each row of the second one or more columns of the second database table to respective second rows of the second predetermined schema associated with the second entity;
determine matching ones of the first rows of the second predetermined schema and the second rows of the second predetermined schema; and
based on the matching ones of the first rows of the second predetermined schema and the second rows of the second predetermined schema, identify the second one or more columns of the first database table and the second one or more columns of the second database table as a second JOIN key between the first database table and the second database table.

17. The medium according to claim 16, wherein mapping the data of each row of the first one or more columns of the first database table to respective first rows of the predetermined schema associated with the entity comprises modifying the data of each row of the first one or more columns of the first database table based on first data cleansing rules associated with the entity,
wherein mapping the data of each row of the first one or more columns of the second database table to respective second rows of the predetermined schema associated with the entity comprises modifying the data of each row of the first one or more columns of the second database table based on the first data cleansing rules associated with the entity,
wherein mapping the data of each row of the second one or more columns of the first database table to respective first rows of the second predetermined schema associated with the second entity comprises modifying the data of each row of the second one or more columns of the first database table based on second data cleansing rules associated with the second entity, and
wherein mapping the data of each row of the second one or more columns of the second database table to respective second rows of the second predetermined schema associated with the second entity comprises modifying the data of each row of the second one or more columns of the second database table based on the second data cleansing rules associated with the second entity.

18. The medium according to claim 14, the program code further executable by the processor to cause the processor to:
   identify a second one or more columns of the first database table as associated with a second entity and second one or more columns of the second database table as associated with the second entity;
   map the data of each row of the second one or more columns of the first database table to respective first rows of a second predetermined schema associated with the second entity;
   map the data of each row of the second one or more columns of the second database table to respective second rows of the second predetermined schema associated with the second entity;
   determine matching ones of the first rows of the second predetermined schema and the second rows of the second predetermined schema;
   determine a percentage of the first rows of the second predetermined schema which match at least one of the second rows of the second predetermined schema determine that the percentage is less than a threshold percentage; and based on the determination that the percentage is less than a threshold percentage, identify the second one or more columns of the first database table and the second one or more columns of the second database table as not comprising a JOIN key between the first database table and the second database table.

19. The medium according to claim 14, wherein mapping the data of each row of the first one or more columns of the first database table to respective first rows of the predetermined schema associated with the entity comprises modifying the data of each row of the first one or more columns of the first database table based on first data cleansing rules associated with the entity, and
   wherein mapping the data of each row of the first one or more columns of the second database table to respective second rows of the predetermined schema associated with the entity comprises modifying the data of each row of the first one or more columns of the second database table based on the first data cleansing rules associated with the entity.

* * * * *